United States Patent [19]

Sakurai et al.

[11] Patent Number: 4,572,030

[45] Date of Patent: Feb. 25, 1986

[54] AUTOMATIC TRANSMISSION CONTROL SYSTEM FOR VEHICLE

[75] Inventors: Yoshimi Sakurai, Tanashi; Junichi Miyake, Hidaka, both of Japan

[73] Assignee: Honda Giken Kogyo Kabushiki Kaisha, Tokyo, Japan

[21] Appl. No.: 512,890

[22] Filed: Jul. 11, 1983

[30] Foreign Application Priority Data

Jul. 12, 1982 [JP] Japan .................. 51-121054

[51] Int. Cl.⁴ .............. B60K 41/08; F16H 47/00; H01H 3/14; G01D 5/34
[52] U.S. Cl. .................. 74/866; 74/865; 74/877; 74/732; 250/229; 250/231 SE; 200/61.89
[58] Field of Search .......... 74/866, 865, 513, 514, 74/645, 877, 731, 732, 733; 200/61.89; 250/229, 231 R, 231 SE; 340/69; 192/0.09, 0.044, 3.31

[56] References Cited

U.S. PATENT DOCUMENTS

| | | | |
|---|---|---|---|
| 2,164,114 | 6/1939 | Kolb | 250/231 R |
| 3,689,771 | 9/1972 | Sharp et al. | 250/231 R X |
| 3,814,199 | 6/1974 | Jones | 250/229 X |
| 3,814,934 | 6/1974 | Mesh et al. | 250/231 SE |
| 3,824,878 | 7/1974 | Grosseau | 74/866 |
| 3,881,368 | 6/1975 | Furuhashi et al. | 74/866 |
| 4,046,032 | 9/1977 | Braun et al. | 74/877 X |
| 4,331,045 | 5/1982 | Piech et al. | 74/877 X |
| 4,369,578 | 1/1983 | Ernst | 250/231 SE X |
| 4,375,592 | 3/1983 | Cox et al. | 250/231 SE |
| 4,429,219 | 1/1984 | Yochum et al. | 250/229 |
| 4,456,107 | 6/1984 | Ito et al. | 74/866 X |

Primary Examiner—William F. Pate, III
Assistant Examiner—Stephen B. Andrews
Attorney, Agent, or Firm—Armstrong, Nikaido, Marmelstein & Kubovcik

[57] ABSTRACT

An automatic transmission control system for a vehicle, including a throttle valve-opening detector and an electronic controller. The throttle valve-opening detector includes a detection arm mounted either on the accelerator pedal arm or the like rotary member of the accelerator operating system for controlling the opening of the throttle valve, or on the body of the vehicle pivotally supporting the rotary member. A position detector is mounted on the other of the rotary member and the vehicle body and equipped with a light-emitting element and a light-receiving element which face each other across both side surfaces of a shutter portion formed at an end portion of the detection arm. The light-receiving element is sensitive to an optical beam emitted from the light-emitting element and generates an electric signal. An aperture is further formed in the shutter portion so as to be movable into and out of the gap between the light-emitting and -receiving elements at predetermined rotational positions of the rotary member. The electronic controller is interposed between the throttle valve-opening detector and the like detectors and a variety of operating devices for the automatic transmission for the purpose of processing output signals from the throttle valve-opening detector and the other detectors to control the operating devices.

4 Claims, 7 Drawing Figures

AUTOMATIC TRANSMISSION CONTROL SYSTEM FOR VEHICLE

BACKGROUND OF THE INVENTION

1. Field of the Invention

The present invention relates to an automatic transmission control system for a vehicle for controlling a variety of operating devices in the automatic transmission of the vehicle, such as a creep-preventing device or a direct clutch, in accordance with the running state of the vehicle.

2. Description of the Prior Art

A creep-preventing device is used to release or damp the coupling force of the starting clutch so as to prevent the so-called "creep phenomenon" in which a vehicle is liable to run forward when the shift lever is set at its drive position with the engine idling. A direct clutch mechanically couples pump vane wheel and turbine vane wheel so as to eliminate any slippage in the clutch region of a fluid torque converter. The throttle valve opening of the engine plays an important role in the generation of control signals for both.

As a throttle valve-opening detector for detecting a predetermined opening of the throttle valve to generate an electric signal, there is known in the art a device in which a switch is disposed oppositely to an accelerator pedal arm for controlling the opening of the throttle valve so that the switch is operated at a predetermined opening of the throttle valve by the accelerator pedal arm. Since a plurality of predetermined openings of the throttle valve must be detected to control the creep-preventing device, the direct clutch and so on described hereinbefore, however, the device according to the prior art requires a number of switches that corresponds to the number of predetermined openings, thus raising a disadvantage that it is expensive to produce.

SUMMARY OF THE INVENTION

It is, therefore, an object of the present invention to provide an inexpensive control system of the above type, which is able to control a variety of operating devices of the automatic transmission according to the running state of the vehicle simply by using a photoelectric device equipped with only one pair of light-emitting and -receiving elements as the throttle valve opening detector.

Other objects and advantages of the present invention will become apparent from the following description taken in conjunction with the accompanying drawings.

BRIEF DESCRIPTION OF THE DRAWINGS

The drawings show two embodiments of the present invention, wherein.

DESCRIPTION OF THE PREFERRED EMBODIMENTS

Figure 1:
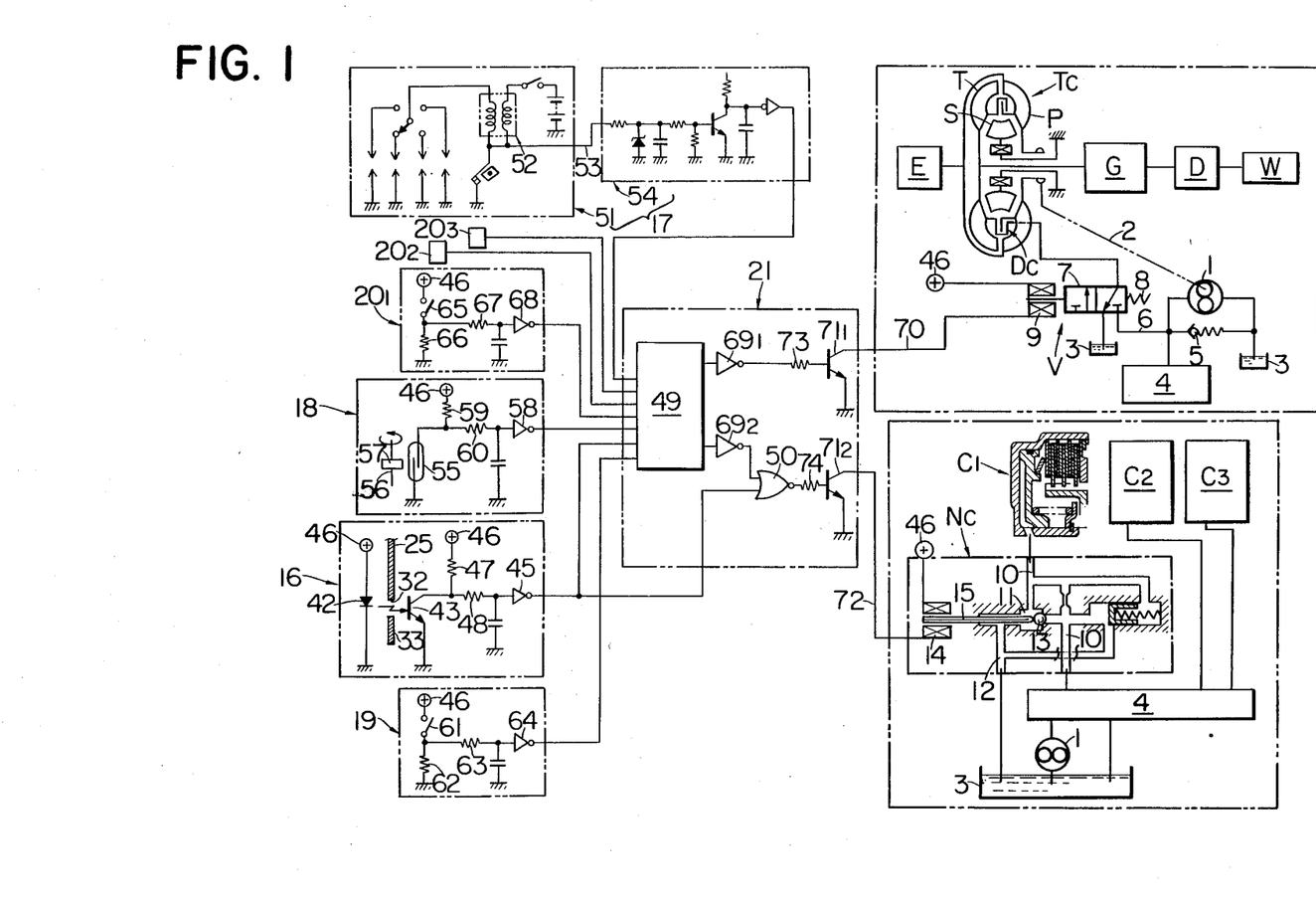
FIG. 1 is a diagram of the complete structure showing the power system and the hydraulic and electric circuits of an automatic transmission.

The present invention will be described in the following in connection with an embodiment thereof with reference to the accompanying drawings. Referring first to FIG. 1, the output of an engine E is transmitted to a pump vane wheel P of a fluid torque converter Tc, from which it is further transmitted in a fluid-dynamically to a turbine vane wheel T. When there is a velocity difference between the pump vane wheel P and the turbine vane wheel T, establishing a torque amplification action, this reaction is borne by a stator vane wheel S. The output torque from the turbine vane wheel T is transmitted through an auxiliary transmission G and a differential mechanism D to a driving wheel W of the vehicle. The auxiliary transmission G is equipped with three forward speed stage gear trains (none of which are shown) with different speed ratios, and frictional engagement devices $C_1$, $C_2$ and $C_3$ such as hydraulic clutches or brakes for operating respective gear trains.

Between the pump vane wheel P and the turbine vane wheel T, a hydraulic direct clutch Dc is interposed which directly connects the pump vane wheel P and the turbine vane wheel T in a mechanical manner and which is hydraulically operated by a switch valve V.

The pump vane wheel P is adapted to drive a hydraulic pump 1 through a gear mechanism or other suitable transmission mechanism 2 to feed the oil in an oil tank 3 to a transmission controller 4 under pressure, a regulator valve 5 is provided to regulate the discharge pressure of the hydraulic pump 1 to be at a predetermined level.

The transmission controller 4 detects the speed of the vehicle and the opening of a throttle valve representing the magnitude of the output of the engine E, and supplies the discharge pressure of the hydraulic pump 1 selectively to the frictional engagement devices $C_1$, $C_2$ and $C_3$ whenever the values detected exceed reference values. Thus, when the frictional engagement devices $C_1$, $C_2$ and $C_3$ are supplied with the hydraulic pressure, the corresponding first (or low), second and third (or top) gears are established by operating the corresponding gear trains.

The switch valve V is constructed of a spool 7, which can move between a left-hand position providing communication between the hydraulic chamber of the direct clutch Dc and the oil tank 3, and a right-hand position providing communication between the hydraulic chamber and the discharge side oil line 6 of the hydraulic pump 1; a return spring 8 for biasing the spool 7 to the left at all times; and a solenoid 9 for moving the spool 7 to the right when it is magnetized by a power supply. When the solenoid 9 is deenergized, therefore, the spool 7 occupies its left-hand position, as shown, so that the hydraulic chamber of the direct clutch Dc communicates with the oil tank and becomes disconnected. When the spool 7 is shifted to the right-hand position when the solenoid 9 is energized, on the other hand, the hydraulic chamber of the direct clutch Dc is supplied with oil under pressure from the oil line 6 so that it becomes connected.

A creep-preventing device Nc is interposed between the frictional engagement device $C_1$ for the first gear, i.e., for starting, and the transmission controller 4. The device Nc is equipped with a valve chamber 11 which is formed midway of an oil supply line 10 connecting the transmission controller 4 and the hydraulic chamber of the starting frictional engagement device $C_1$, a discharge oil line 12 which leads from the valve chamber 11 to the oil tank 3, and a ball valve 13 which is positioned in the valve chamber 11 for alternately opening and closing the upstream side of the oil supply line 10 (i.e., the side close to the transmission controller 4) and the discharge oil line 12. An actuating rod 15 operated by a solenoid 14 abuts against the ball valve 13. When the solenoid 14 is deenergized, the ball valve 13 is moved to the left in the drawing by the oil pressure of the oil supply line 10 to close the discharge oil line 12 and render the oil supply line 10 conductive. In that state, therefore, when a pressure oil is supplied from the transmission controller 4 to the oil supply line 10, it is introduced into the hydraulic chamber of the starting frictional engagement device $C_1$ so that this device $C_1$ is enabled to effect the starting operation. When the solenoid 14 is energized, on the other hand, the actuating lever 15 is operated to push the ball valve 13 to the right in the drawing by the magnetic force of the solenoid 14 to open the discharge oil line 12 but close the upstream side of the oil supply line 10 so that the hydraulic chamber of the starting frictional engagement device $C_1$ communicates with the oil tank 3. As a result, the device $C_1$ is made inoperative irrespective of the state of the upstream side of the oil supply line 10 so that the creep phenomenon of the vehicle is suppressed.

In order to control the operations of the transmission controller 4, creep-preventing device Nc, and direct clutch Dc thus far described, the following are provided: a throttle valve opening detector 16, an engine r.p.m. detector 17, a vehicular speed detector 18, a brake operation detector 19, a first-gear position detector $20_1$ for the shift lever, a second-gear position detector $20_2$ for the shift lever, a third-gear position detector $20_3$ for the shift lever, and an electronic controller 21 for processing output signals from the detectors 16 to $20_3$ to turn on and off the respective power supply circuits of the solenoids 9 and 14. These devices will be explained in order below.

First of all the throttle valve opening detector 16 will be described with reference to FIGS. 2 to 5. Reference numeral 22 denotes a bracket which is fixed to a predetermined position of the body (not shown) of the vehicle to form a part of the latter. An accelerator pedal arm 23 which is connected to the throttle valve of the engine E is supported pivotally by a pivot pin 24 to the bracket 22. As a result, the accelerator pedal arm 23 can be turned, when a pedal 23a formed on one end of the arm 23 is depressed, to open the throttle valve of the engine E.

Figure 2:
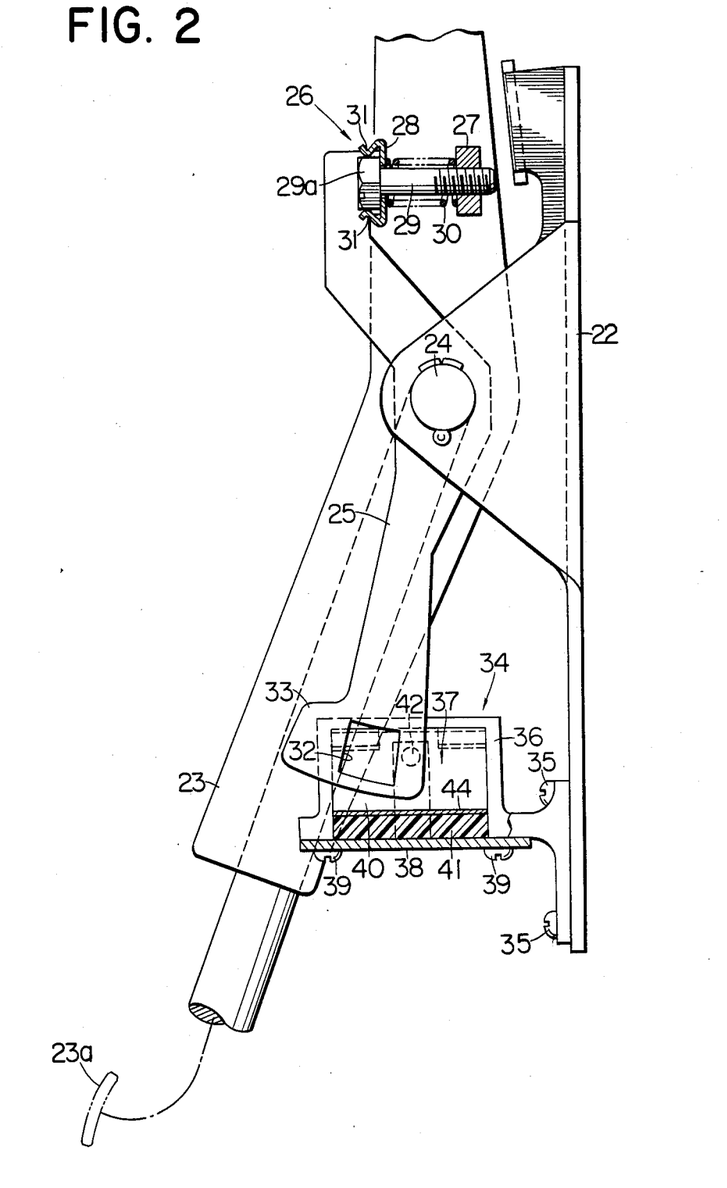
FIG. 2 is a partial longitudinally-sectioned side elevation of a principal part of an accelerator operating system equipped with a throttle valve-opening detector according to one embodiment of the invention.
Figure 3:
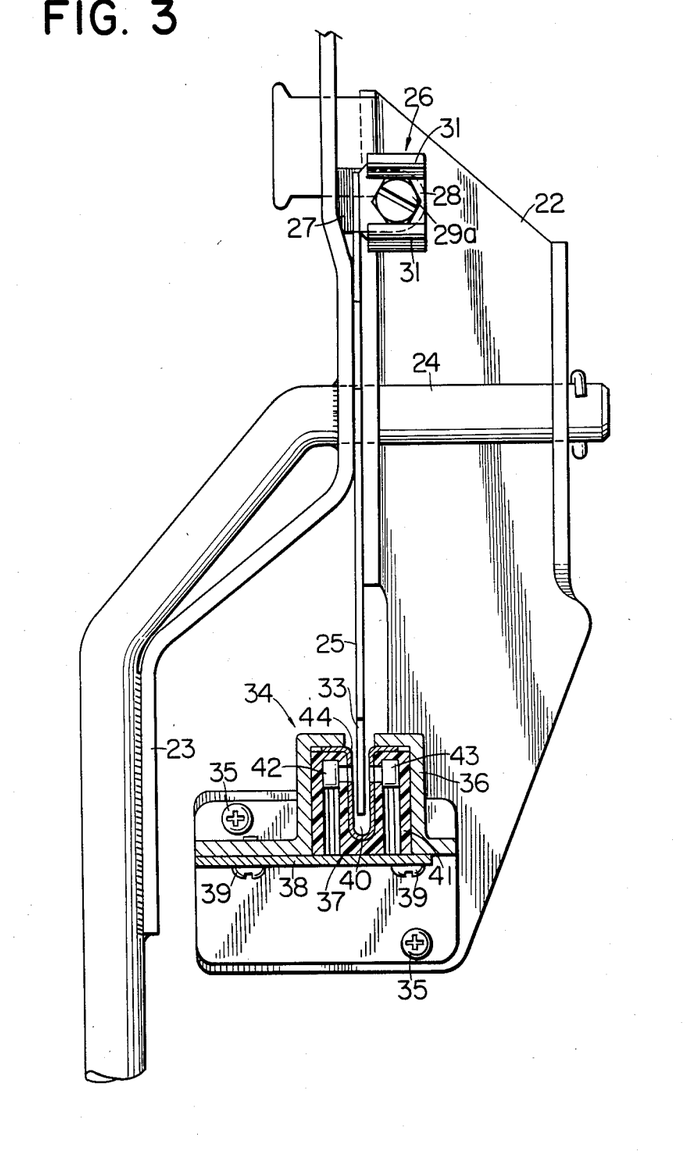
FIG. 3 is a plan view of the same in partly cross-section.

A detection arm 25 made of steel plate is attached to the accelerator pedal arm 23 by the pivot pin 24 in a relatively rotatable manner. The accelerator pedal arm 23 and the detection arm 25 are connected by a position adjustor 26 which can adjust the relative rotational positions of the two.

The adjustor 26 is constructed of a connecting boss 27 which is formed at one end of the accelerator pedal arm 23, a connecting member 28 which is bent from one side of the detection arm 25 and faces the boss 27, an adjustment bolt 29 which is screwed into the connecting boss 27 through the connecting member 28, and a coil spring 30 which is interposed under compression between the connecting boss 27 and the connecting member 28 so as to hold the lower side of a hexagonal head of the adjustment body 29 always in contact with the connecting member 28. The connecting member 28 has both its end portions bent to form a pair of clamping members 31 for clamping the hexagonal head 29a elastically. The clamping members 31 are designed to impart a predetermined rotational resistance to the adjustment bolt 29 at each time when they engage with the flat sides of the hexagonal head 29a. As a result, the clamping members 31 and the hexagonal head 29a together constitute a kind of click-stop mechanism.

A shutter portion 33 which has an aperture 32 acting as a transparent portion is formed integrally with the other end of the detection arm 25. A photoelectric position detector 34 which acts together with the shutter portion 33 is mounted on the bracket 22.

Figures 4, 5:
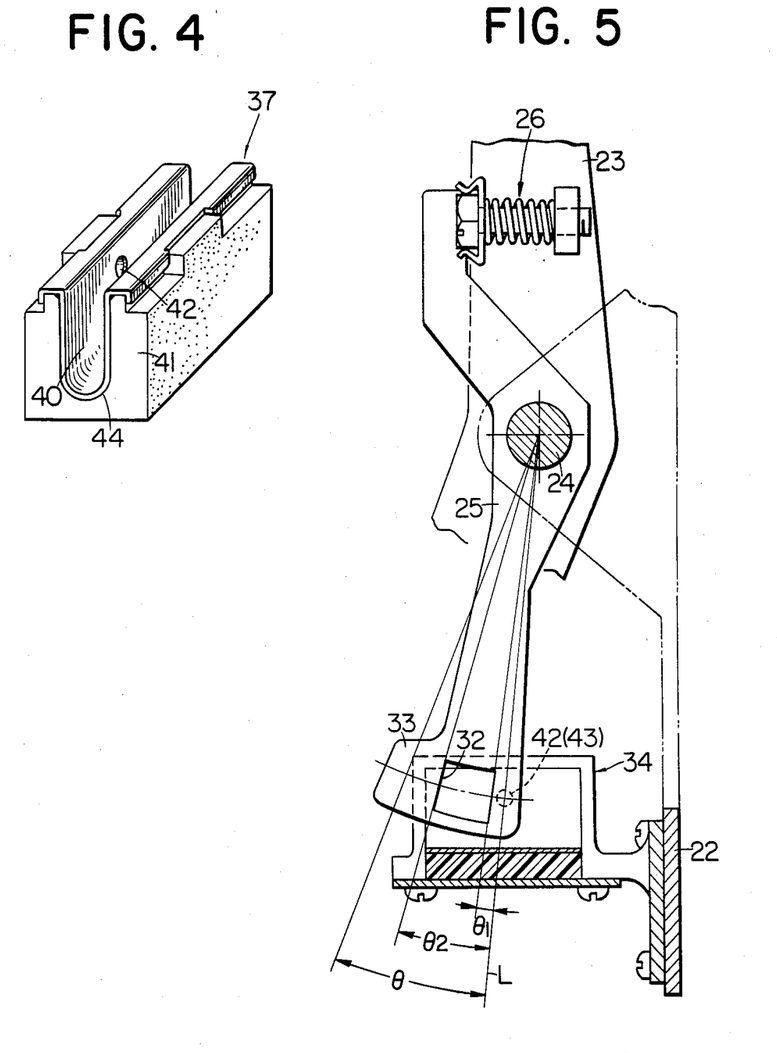
FIG. 4 is a perspective view of a photoelectric unit forming an essential part of the same.
FIG. 5 is a view explaining the operation of the same.

The position detector 34 has a housing 36 which is fixed to a predetermined position of the bracket 22 by means of screws 35. A photoelectric unit 37 is fitted into the housing 36, and a cover plate 38 holding the unit 37 is fixed to the housing 36 by means of screws 39. The photoelectric unit 37 is constructed of a unit body 41 which is made of a synthetic resin and which is provided with a groove 40 in which the shutter portion 33 fits, and light-emitting and -receiving elements 42 and 43 which are embedded in the unit body 41 so as to face each other across the groove 40. The light-receiving element 43 is sensitive to an optical beam emitted from the light-emitting element 42 to generate an electric signal. A metal protecting plate 44 covering the wall of the groove 40 is clamped between the unit body 41 and the housing 36.

As shown in FIG. 5, the angle subtended by the shutter portion 33 around the pivot pin 24 is made sufficiently larger than the full rotary stroke angle $\theta$ of the accelerator pedal arm 23 corresponding to the full operation stroke of the throttle valve of the engine from the fully closed position to the fully open position. The aperture 32 is formed so that it starts at a position which is separated by a predetermined small angle $\theta_1$ from a reference line L passing through the center of the pivot pin 24, and terminates at a position which is a predetermined angle $\theta_2$ further away.

If the adjustment bolt 29 is turned to the released position of the accelerator pedal arm 23, i.e., the position where the arm 23 is inoperative, the detection arm 25 can be turned to the right or left about the pivotal pin 24 in accordance with the rotational direction of the adjustment bolt 29 so that the arm 25 can change its position relative to the position detector 34. By this adjustment operation, therefore, the reference line L is first aligned with the center line of the light-emitting and -receiving elements 42 and 43 of the position detector 34.

As a result, at the return position of the accelerator pedal arm 23, the optical beam emitted from the light-emitting element 42 is shielded by the shutter portion 33 so that it does not reach the light-receiving element 43 to let the light-receiving element 43 generate a low-level signal.

If the accelerator pedal 23a is then depressed to turn the arm 23 as if to start the vehicle, the detection arm 25 rotates simultaneously therewith. Since the aperture 32 enters the gap between the light-emitting element 42 and the light-receiving element 43 as soon as the rotational angle thereof exceeds the small angle $\theta_1$, the optical beam emitted from the light-emitting element 42 reaches the light-receiving element 43 through the aperture 32 so that the light-receiving element 43 senses the light and generates a high-level signal.

If the rotational angles of the accelerator pedal arm 23 and the detection arm 25 exceed the small angle $\theta_2$ as a result of further depression of the accelerator pedal 23a, the aperture 32 goes away from the gap between the light-emitting and -receiving elements 42 and 43, and the shutter portion 33 again shields the optical beam emitted from the light-emitting element 42 so that the output signal from the light-receiving element 43 returns to the low level.

Referring back to FIG. 1, when the output signal of the light-receiving element 43 is at a low level, an inverting amplifier 45 receives a high-level input signal from a power source 46 through resistors 47 and 48 so that its output signal becomes a low level. When the output signal of the light-receiving element 43 is at a high level, on the other hand, the output signal of the inverting amplifier 45 becomes high. The output signals from the inverting amplifier 45 thus far described are input to an arithmetic circuit 49 and a NOR circuit 50, both belonging to the electronic controller 21.

The engine r.p.m. detector 17 is constructed by connecting a waveform shaper 54 via a pickup circuit 53 to an ignition coil 52 of the ignition circuit 51 of the engine E. Pulses generated in accordance with the interruptions of the ignition coil 52 are shaped by the waveform shaper 54 and are then fed to the arithmetic circuit 49 so that the engine speed is calculated from the pulse period thereof.

The vehicular speed detector 18 is constructed of a reed switch 55 which is fixed to a suitable portion of the body of the vehicle, and a magnet rotor 57 fixed to a rotary member, e.g., a speed meter cable 56, which is operatively connected to the wheels. The reed switch 55 is turned on and off every time the rotor 57 turns once. While the reed switch 55 is open, an inverting amplifier 58 receives a high-level input signal from the power source 46 through resistors 59 and 60 and outputs a low-level signal. When the reed switch 55 is closed on the other hand, the output signal from the inverting amplifier 58 is at a high level. The output signals of the inverting amplifier 58 thus far described are fed to the arithmetic circuit 49 so that the speed of the vehicle is calculated from the period of the input pulses.

The brake operation detector 19 is equipped with a normally-closed switch 61 which opens only when the brake pedal of the vehicle is depressed. When the switch 61 is closed, a high-level signal, which has passed through a resistor 63, is fed from the power source 46 to an inverting amplifier 64 because of the presence of a load resistor 62 so that the resultant output signal is at a low level. When the switch 61 is opened, on the other hand, the output signal of the inverting amplifier 64 is at a high level. The output signals from the inverting amplifier 64 thus far described are fed to the arithmetic circuit 49.

The first-gear position detector $20_1$ is equipped with a normally-open switch 65 which closes only when the shift lever is set at the first-gear holding position. When the switch 65 is closed, a high-level signal, which has passed through a resistor 67, is fed from the power source 46 to an inverting amplifier 68 because of the presence of a load resistor 66 so that the resultant output signal is low. When the switch 65 is opened, on the other hand, the signal output from the inverting amplifier 68 is at a high level. The output signals from the inverting amplifier 68 thus far described are fed to the arithmetic circuit 49.

The second-gear position detector $20_2$ and the third-gear position detector $20_3$ are adapted to detect that the shift lever is set at the second- and third-gear holding positions, respectively. The detectors $20_2$ and $20_3$ have similar constructions to that of the first-gear position detector $20_1$ so that a detailed explanation thereof is omitted.

The electronic controller 21 is equipped with the arithmetic circuit 49, the NOR circuit 50, first and second inverting amplifiers $69_1$ and $69_2$ connected to two output terminals of the arithmetic circuit 49, respectively, a first transistor $71_1$ which is connected to a power supply circuit 70 for the solenoid 9 of the switch valve V, and a second transistor $71_2$ which is connected to a power supply circuit 72 for the solenoid 14 of the creep-preventing device Nc. A signal output from the first inverting amplifier $69_1$ is fed to the base of the first transistor $71_1$ through a resistor 73 while a signal output from the second inverting amplifier $69_2$ is fed to the NOR circuit 50. The NOR circuit 50 feeds an output signal to the base of the second transistor $71_2$ through a resistor 74.

The operation of the aforementioned embodiment will be described in the following.

Control of Creep-Preventing Device Nc

When the accelerator pedal 23 is in its released position, the inverting amplifier 45 sends a low-level signal to one input terminal of the NOR circuit 50 when the shutter portion 33 of the detection arm 25 shuts off the optical beam emitted from the light-emitting element 42, as has been described above. If, at this time, the engine E is idling, the arithmetic circuit 49 judges that state from the signal sent from the engine r.p.m. detector 17 and sends a low-level signal to the other input terminal of the NOR circuit 50 through the second inverting amplifier $69_2$. As a result, the NOR circuit 50 generates a high-level output which turns on the second transistor $71_2$ to magnetize the solenoid 14. Thus, the creep-preventing device Nc is enabled to release the coupling force of the starting frictional engagement element $C_1$.

When the accelerator pedal arm 23 is still in its released position, the arithmetic circuit 49 sends a low-level signal to the other input terminal of the NOR circuit 50 through the second inverting amplifier $69_2$ when it is judged from a signal received from the vehicular speed detector 18 that the vehicle is stopped, or when it is judged from a signal received from the brake operation detector 19 that the brake is operating, or when it is judged from a signal received from the first-gear position detector $20_1$ that the shift lever is set at its first-gear holding position. As in the above case, therefore, the creep-preventing device Nc can be brought into operation.

When the accelerator pedal 23a is depressed to start and its arm 23 is turned through more than the predetermined small angle $\theta_1$, the aperture 32 of the shutter portion 33 allows the optical beam emitted from the light-emitting element 42 to reach the light-receiving element 43, causing the inverting amplifier 45 to raise the signal sent to the input terminal of the NOR circuit 50 to a high level. As a result, the output from the NOR circuit 50 instantly goes down to a low level so that the second transistor $71_2$ is turned off to demagnetize the solenoid 14. As a result, the operation of the creep-preventing device Nc is released, that is to say, the starting frictional engagement device $C_1$ restores its coupling force so that the vehicle can start.

When the accelerator pedal 23a is depressed further and the angle of rotation of its arm 23 exceeds $\theta_2$, the shutter portion 33 again shuts off the optical beam emitted from the light-emitting element 42 so that the signal input to the one input terminal of the NOR circuit 50 goes back to a low level. At this stage, however, since the engine speed and the vehicular speed exceed certain values, the arithmetic circuit 49 judges that state from the signals from the engine r.p.m. detector 17 and the vehicular speed detector 18 to raise the signal input to the other input terminal of the NOR circuit 50 to a high level. As a result, the output from the NOR circuit 50 is still held at a low level so that the creep-preventing device Nc does not operate during the running of the vehicle.

Control of Direct Clutch Dc

When the angle of rotation of the accelerator pedal arm 23 excceds $\theta_1$ and the shift lever is at the second- or third-gear holding position, the arithmetic circuit 49 judges this state from the signals from the throttle valve opening detector 16, the second-gear position detector $20_2$ and the third-gear position detector $20_3$ and sends a low-level signal to the first inverting amplifier $69_1$. Then, since the output from the inverting amplifier $69_1$ is at a high level, the first transistor $71_1$ is turned on by that output to magnetize the solenoid 9. Thus, the direct clutch Dc is enabled to mechanically connect the pump vane wheel P and the turbine vane wheel T of the torque converter Tc together.

As is apparent from the description thus far made, the creep-preventing device Nc and the direct clutch Dc correspond to the various operating devices of the present invention.

Figure 6:
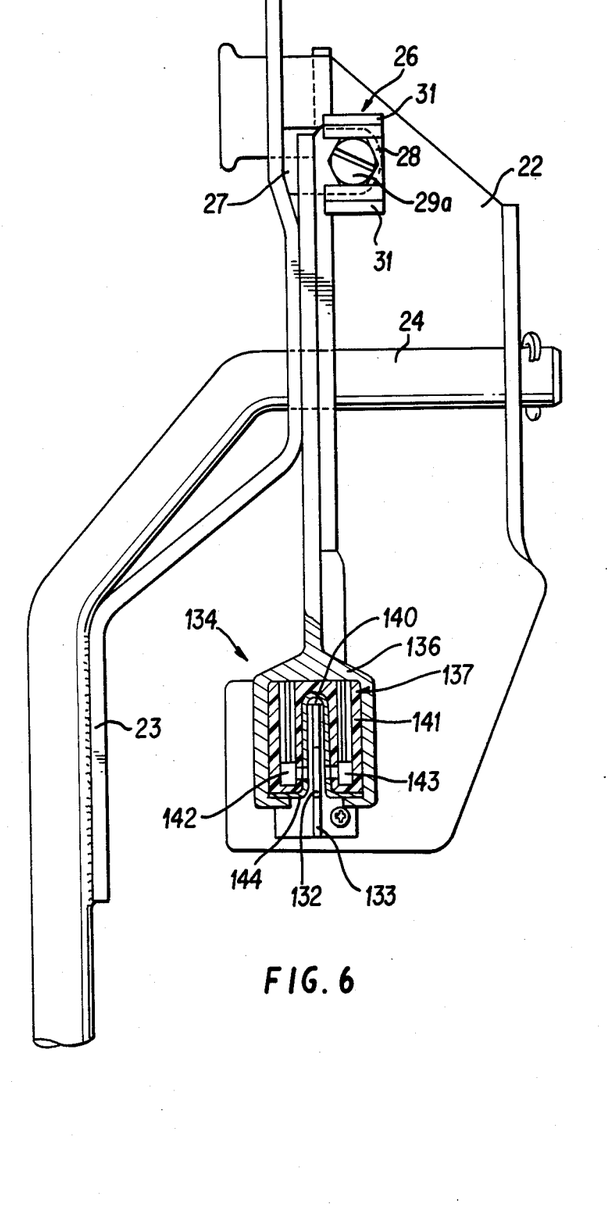
FIG. 6 is a plan view of a system partly in section according to another embodiment.
Figure 7:
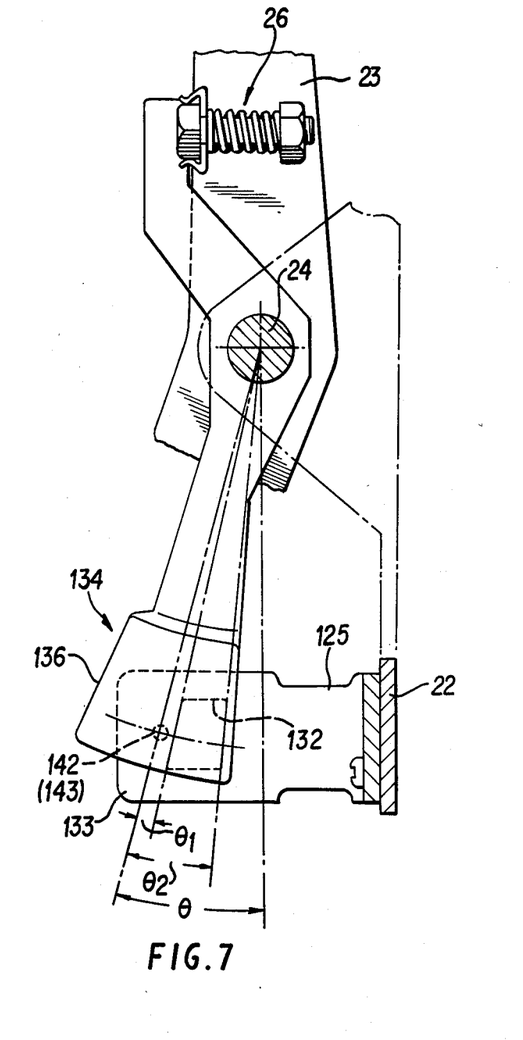
FIG. 7 is a side view of the system of FIG. 6.

FIGS. 6 and 7 show another embodiment of the invention having substantially the same structure as the above-described embodiment except that a position detector 134 is mounted on the accelerator pedal arm 23 and a detection arm 125 is mounted on the bracket 22.

As has been described above, according to the present invention, an automatic transmission control system for a vehicle comprises: a throttle valve-opening detector including a detection arm mounted either on the accelerator pedal arm or the like rotary member associated with the accelerator operating system for controlling opening and closing of the engine throttle valve, or on the vehicle body pivotally supporting the rotary member, a position detector mounted on the other of the rotary member and the vehicle body and equipped with a light-emitting element opposed to one end of the detection arm with both side surfaces of a shutter portion interposed therebetween and a light-receiving element formed sensitive to an optical beam emitted from the light-emitting element to generate an electric signal, and an aperture formed in the shutter portion so as to be movable into and out of a gap between the light-emitting and light-receiving elements at predetermined rotational positions of the rotary member; and an electronic controller interposed between the throttle valve-opening detector as well as other detectors such as an engine r.p.m. detector and a variety of operating devices for an automatic transmission, said electronic controller operating to process output signals from the throttle valve-opening detector and the other detectors to control the operating devices. Thus the operating devices for the automatic transmission can be controlled in accordance with the running states of the vehicle merely by using a photoelectric type throttle valve-opening detector equipped with only one pair of light-emitting and light-receiving elements. As a result, it is possible to provide a control system for an automatic transmission at a low cost.

What is claimed is:

1. An automatic transmission control system for a vehicle, comprising:

a throttle valve-opening detector including a detection arm mounted on a rotary member associated with an accelerator operating system for controlling opening and closing of an engine throttle valve and being pivotally supported on a vehicle body, said detection arm having at one end thereof a shutter portion, a position detector mounted on a vehicle body and including a light-emitting element and a light-receiving element formed sensitive to an optical beam emitted from said light-emitting element to generate an electric signal, said light-emitting element and light-receiving element being opposed to each other with both side surfaces of said shutter portion interposed therebetween, and an aperture formed in said shutter portion so as to be movable into and out of a gap defined between said light-emitting and light-receiving elements at predetermined rotational positions of said rotary member; and an electronic controller interposed between said throttle valve-opening detector as well as other detectors and a direct clutch of a torque converter as well as a creep-preventing device for the automatic transmission, said electronic controller being adapted to process output signals from said throttle valve-opening detector and said other detectors to control said direct clutch and said creep-preventing device; said aperture in the shutter portion being so formed that it allows passage of the optical beam therethrough from the light-emitting element to the light-receiving element when said detection arm is rotated by an angle which is between a first predetermined value and a second predetermined value larger than the first predetermined value said creep-preventing device being made operative under a condition where said detection arm is rotated by an angle below said first predetermined value while said direct clutch being made operative under a condition where the detection arm is rotated by an angle which is between said first and second predetermined value.

2. A control system as claimed in claim 1 wherein said rotary member is an accelerator pedal arm.

3. An automatic transmission control system for a vehicle, comprising:

a throttle valve-opening detector including a detection arm mounted on a vehicle body, said detector arm having at one end thereof a shutter portion, a position detector mounted on a rotary member associated with an accelerator operating system for controlling opening and closing of an engine throttle valve, said rotary member being pivotally mounted on said vehicle body, said position detector including a light-emitting element and a light-receiving element formed sensitive to an optical beam emitted from said light-emitting element to generate an electric signal, said light-emitting element and light-receiving element being opposed to each other defining a gap therebetween with both side surfaces of said shutter portion being interposed in said gap, and an aperture formed in said shutter portion, said position detector being movable with said rotary member so said optical beam passes through said aperture at predetermined rotational positions of said rotary member; and an electronic controller interposed between said throttle valve-opening detector as well as other detectors and a direct clutch of a torque convertor as well as a creep-preventing device for the automatic transmission, said electronic controller being adapted to process output signals from said throttle valve-opening detector and said other detectors to control said direct clutch and said creep-preventing device, said aperture in the shutter portion being so formed that it allows passage of the optical beam therethrough from the light-emitting element to the light-receiving element when said position detector is rotated by an angle which is between a first predetermined value and a second predetermined value larger than the first predetermined value, said creep-preventing device being made operative under a condition where said position detector is rotated by an angle below said first predetermined value while said direct clutch being made operative under a condition where the position detector is rotated by an angle which is between said first and second predetermined values.

4. A control system as claimed in claim 3 wherein said rotary member is an accelerator pedal arm.

* * * * *